United States Patent
Jeon (10) Patent No.: US 10,904,252 B1
(45) Date of Patent: Jan. 26, 2021

(54) MULTI-NODE AUTHENTICATION METHOD AND APPARATUS BASED ON BLOCK CHAIN

(71) Applicant: FNS Value Co., Ltd., Seoul (KR)

(72) Inventor: Seung Ju Jeon, Paju-si (KR)

(73) Assignee: FNS Value Co., Ltd., Seoul (KR)

( * ) Notice: Subject to any disclaimer, the term of this patent is extended or adjusted under 35 U.S.C. 154(b) by 0 days.

(21) Appl. No.: 16/911,262

(22) Filed: Jun. 24, 2020

(30) Foreign Application Priority Data

Jan. 17, 2020 (KR) .................. 10-2020-0006473

(51) Int. Cl.
*H04L 29/06* (2006.01)
*H04L 9/06* (2006.01)
*H04L 9/32* (2006.01)

(52) U.S. Cl.
CPC ........ *H04L 63/0876* (2013.01); *H04L 9/0637* (2013.01); *H04L 9/3215* (2013.01); *H04L 9/3231* (2013.01); *H04L 2209/38* (2013.01)

(58) Field of Classification Search
CPC . H04L 63/0876; H04L 9/0637; H04L 9/3231; H04L 9/3215; H04L 2209/38
USPC ........................................................ 713/168
See application file for complete search history.

(56) References Cited

U.S. PATENT DOCUMENTS

| | | | |
|---|---|---|---|
| 6,742,114 B1 * | 5/2004 | Carter | H04L 63/08 709/201 |
| 8,245,050 B1 * | 8/2012 | Subramanian | H04L 67/1097 713/183 |
| 8,484,470 B2 * | 7/2013 | Sakakihara | G06F 21/46 713/168 |
| 9,660,970 B1 * | 5/2017 | Rubin | H04L 9/0825 |
| 9,847,978 B2 * | 12/2017 | Greenberg | H04L 63/0823 |

(Continued)

FOREIGN PATENT DOCUMENTS

| | | |
|---|---|---|
| JP | 2019-057827 A | 4/2019 |
| KR | 10-2017-0080591 A | 7/2017 |

(Continued)

OTHER PUBLICATIONS

"Grant of Patent" Office Action issued in KR 10-2020-0006473; mailed by the Korean Intellectual Property Office dated Mar. 20, 2020.

*Primary Examiner* — Taghi T Arani
*Assistant Examiner* — Badri Champakesan
(74) *Attorney, Agent, or Firm* — Studebaker & Brackett PC (57) ABSTRACT

The authentication method of a block chain authentication module includes: receiving an authentication preparation request; configuring a channel and generating a channel key allocated to the channel; generating a block including an authentication comparison data, the block further including a block key allocated to the block; commonly transmitting the channel key and the block key, and dividing and transmitting the authentication comparison data; transmitting an authentication preparation completion message including the channel key and the block key; receiving an authentication request message including the channel key, the block key, and authentication target data; dividing and transmitting the authentication target data; receiving a result of comparing the divided and transmitted authentication comparison data with the divided and transmitted authentication target; and determining whether the authentication of the terminal succeeds.

16 Claims, 6 Drawing Sheets

(56) References Cited

U.S. PATENT DOCUMENTS

| | | | | |
|---|---|---|---|---|
| 9,853,819 B2* | 12/2017 | Truu | ................... | H04L 9/3239 |
| 2004/0243828 A1* | 12/2004 | Aguilera | ................ | G06F 21/64 |
| | | | | 726/27 |
| 2005/0060556 A1* | 3/2005 | Jonas | ................... | H04L 9/3231 |
| | | | | 713/186 |
| 2013/0291056 A1* | 10/2013 | Gaudet | .............. | H04L 63/0853 |
| | | | | 726/1 |
| 2015/0378842 A1* | 12/2015 | Tomlinson | .......... | G06F 11/1469 |
| | | | | 380/28 |
| 2017/0279801 A1* | 9/2017 | Andrade | ................. | G06F 21/30 |
| 2018/0004957 A1* | 1/2018 | Kocher | ................ | G06F 21/556 |
| 2019/0280863 A1* | 9/2019 | Meyer | .................... | H04L 9/006 |
| 2020/0162246 A1* | 5/2020 | Schouppe | ............... | H04L 9/085 |
| 2020/0226113 A1* | 7/2020 | Cuellar | ................ | H04L 9/0643 |
| 2020/0259646 A1* | 8/2020 | Kwak | .................... | G06F 21/31 |

FOREIGN PATENT DOCUMENTS

| | | |
|---|---|---|
| KR | 10-1816650 B1 | 1/2018 |
| KR | 10-1929482 B1 | 3/2019 |
| KR | 10-1984254 B1 | 5/2019 |
| KR | 10-2019-0118630 A | 10/2019 |
| KR | 10-2041341 B1 | 11/2019 |

* cited by examiner

MULTI-NODE AUTHENTICATION METHOD AND APPARATUS BASED ON BLOCK CHAIN

CROSS-REFERENCE TO RELATED APPLICATIONS

This application claims the priority of Korean Patent Application No. 10-2020-0006473 filed on Jan. 17, 2020, in the Korean Intellectual Property Office, the disclosure of which is incorporated herein by reference.

BACKGROUND

Field

The present specification relates to a terminal authentication method based on a block chain technology and an apparatus therefor.

Description of the Related Art

As virtual currencies, digital virtual currencies based on a block chain have been used on online transactions, and among these digital virtual currencies, Bitcoin has been most widely used. Bitcoin has been developed by a Japanese programmer named Satoshi Nakamoto, and unlike traditional fiat currency, Bitcoin uses peer-to-peer (P2P) technology to be operated without central authority or banks. A block chain technology is applied to these virtual currencies to prevent virtual currencies from being randomly produced and replicated.

The block chain technology is a distributed data storage technology that stores data in blocks, connects the blocks in a chain form, and simultaneously replicates and stores the blocks on numerous computers. This is also called a public transaction ledger. A transaction history is transmitted to all users participating in transaction without keeping a transaction record on a centralized server, and all transaction participants share information and collate the information whenever they make a transaction to prevent data forgery or tampering.

SUMMARY

The conventional technology related to personal authentication has traditionally performed personal authentication using an ID and password, but there is a problem that it is difficult to perform normal personal authentication when the ID and password are leaked.

Therefore, in recent years, various personal authentication methods have been used to supplement the problem of the conventional technology. For example, personal authentication using a mobile phone, personal authentication using a public certificate, personal authentication using a one-time password (OTP), personal authentication using a credit card, or the like has been used.

However, the personal authentication using the public certificate is a relatively high security authentication protocol, but it is not easy to stably carry the public certificate, and the personal authentication using the mobile phone authentication is a method of authenticating the occupancy of a mobile phone using an authentication number and therefore is vulnerable to swishing, or the like.

In addition, these personal authentication methods have a risk of being exposed to hacking because personal identification information, such as social security number, connecting information (CI), and IPIN which are sensitive information, is transmitted on a network in any form.

Accordingly, an object to be achieved by the present disclosure is to provide a new personal authentication method based on a block chain technology in this specification, in order to effectively increase security while minimizing the problems of the personal authentication methods.

According to an aspect of the present disclosure, there is provided an authentication method of a block chain authentication module. The authentication method of a block chain authentication module may include: receiving an authentication preparation request for a terminal; configuring a channel by randomly selecting a plurality of nodes that authenticates the terminal and generating a channel key allocated to the channel; generating a block including authentication comparison data used for the terminal authentication, the block further including a block key allocated to the block; commonly transmitting the channel key and the block key to the plurality of nodes, and dividing and transmitting the authentication comparison data thereto; transmitting an authentication preparation completion message including the channel key and the block key to the terminal; receiving, from the terminal, an authentication request message including the channel key, the block key, and authentication target data that the terminal requests authentication; dividing and transmitting the authentication target data to the plurality of nodes; receiving a result of comparing the divided and transmitted authentication comparison data with the divided and transmitted authentication target data from the plurality of nodes; and determining based on the received comparison result whether the authentication of the terminal succeeds.

Further, each of the authentication comparison data and the authentication target data may be divided into a plurality of categories.

Further, the dividing and transmitting of the authentication comparison data may include dividing the authentication comparison data for each category and transmitting the divided authentication comparison data to different nodes.

Further, the dividing and transmitting of the authentication target data may include dividing the authentication target data for each category and transmitting the divided authentication target data to different nodes but transmitting the divided authentication target data in the same category as the category of the authentication comparison data transmitted to each node.

Further, the plurality of categories may include a user fingerprint, an iris, a pattern, a password, an ID, an e-mail address, a unique serial number of the terminal, a media access control (MAC) address, a Bluetooth address, a WIFI service set identifier (SSID), a universally unique identifier (UUID), and/or a phone number that are registered in the terminal.

Further, the determining whether the authentication of the terminal succeeds may include determining that the authentication of the terminal succeeds when receiving, from nodes exceeding a preset ratio, a result that the divided and transmitted authentication comparison data matches the divided and transmitted authentication target data.

Further, the preset ratio may be set to be 50% of the total number of the plurality of nodes.

Further, the authentication method of the block chain authentication module may further include: deleting the channel, the channel key, and the block when the determination on whether the authentication of the terminal succeeds is completed.

Further, according to another aspect of the present disclosure, there is provided a block chain authentication module. The block chain authentication module may include: a communication unit that performs communication; a memory unit that stores data; and a processor that controls the communication unit and the memory unit, in which the processor may receive an authentication preparation request for a terminal; configure a channel by randomly selecting a plurality of nodes that authenticates the terminal and generate a channel key allocated to the channel; generate a block including an authentication comparison data used for the terminal authentication, the block further including a block key allocated to the block; commonly transmit the channel key and the block key to the plurality of nodes, and divide and transmit the authentication comparison data thereto; transmit an authentication preparation completion message including the channel key and the block key to the terminal; receive, from the terminal, an authentication request message including the channel key, the block key, and authentication target data that the terminal requests authentication; divide and transmit the authentication target data to the plurality of nodes; receive a result of comparing the divided and transmitted authentication comparison data with the divided and transmitted authentication target data from the plurality of nodes; and determine based on the received comparison result whether the authentication of the terminal succeeds.

Further, each of the authentication comparison data and the authentication target data may be divided into a plurality of categories.

Further, the processor may divide the authentication comparison data for each category and transmit the divided authentication comparison data to different nodes when the authentication comparison data is divided and transmitted.

Further, the processor may divide the authentication target data for each category and transmit the divided authentication target data to different nodes but transmit the divided authentication target data in the same category as the category of the authentication comparison data transmitted to each node.

Further, the plurality of categories may include a user fingerprint, an iris, a pattern, a password, an ID, an e-mail address, a unique serial number of the terminal, a media access control (MAC) address, a Bluetooth address, a WIFI service set identifier (SSID), a universally unique identifier (UUID), and/or a phone number that are registered in the terminal.

Further, the processor may determine that the authentication of the terminal succeeds when receiving, from nodes exceeding a preset ratio, a result that the divided and transmitted authentication comparison data matches the divided and transmitted authentication target data.

Further, the preset ratio may be set to be 50% of the total number of the plurality of nodes.

Further, the processor may delete the channel, the channel key, and the block when the determination on whether the authentication of the terminal succeeds is completed.

Details of other exemplary embodiments will be included in the detailed description of the invention and the accompanying drawings.

According to an exemplary embodiment of the present disclosure, since the authentication is performed through multi-nodes other than the authentication module/server, the system complexity and authentication overhead of the authentication module/server is reduced.

In addition, according to the exemplary embodiment of the present disclosure, the authentication is performed through the multi-nodes, so security is very high and the risk of hacking may be minimized due to the difficulty in forgery/tampering of authentication data.

In addition, according to the exemplary embodiment of the present disclosure, the introduction of the new authentication method has the effect that the flexibility of the authentication method is further upgraded.

The effects of the present disclosure are not limited to the aforementioned effects, and various other effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The present disclosure may be variously modified and have several exemplary embodiments. Therefore, specific exemplary embodiments of the present disclosure will be illustrated in the accompanying drawings and be described in detail. However, it is to be understood that the present disclosure is not limited to a specific exemplary embodiment, but includes all modifications, equivalents, and substitutions without departing from the scope and spirit of the present disclosure.

Terms such as 'first', 'second', 'A', 'B', and the like, may be used to describe various components, but the components are not to be interpreted to be limited to the terms and are used only for distinguishing one component from other components. For example, a 'first' component may be named a 'second' component and the 'second' component may also be similarly named the 'first' component, without departing from the scope of the present disclosure. A term 'and/or' includes a combination of a plurality of related described items or any one of the plurality of related described items.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Prior to the detailed description of the drawings, it is intended to clarify that the components in this specification are only distinguished by the main functions of each component. That is, two or more constituent parts to be described below may be combined into one constituent part, or one constituent part may be divided into two or more for each subdivided function. In addition, each of the constituent parts to be described below may additionally perform some or all of the functions of other constituent parts in addition to the main functions of the constituent parts, and some of the main functions of the constituent parts may be performed exclusively by other components.

In addition, in performing the method or the operation method, each of the processes constituting the method may occur differently from the specified order unless a specific order is explicitly described in context. That is, the respective steps may be performed in the same sequence as the described sequence, be performed at substantially the same time, or be performed in an opposite sequence to the described sequence.

Figure 1:
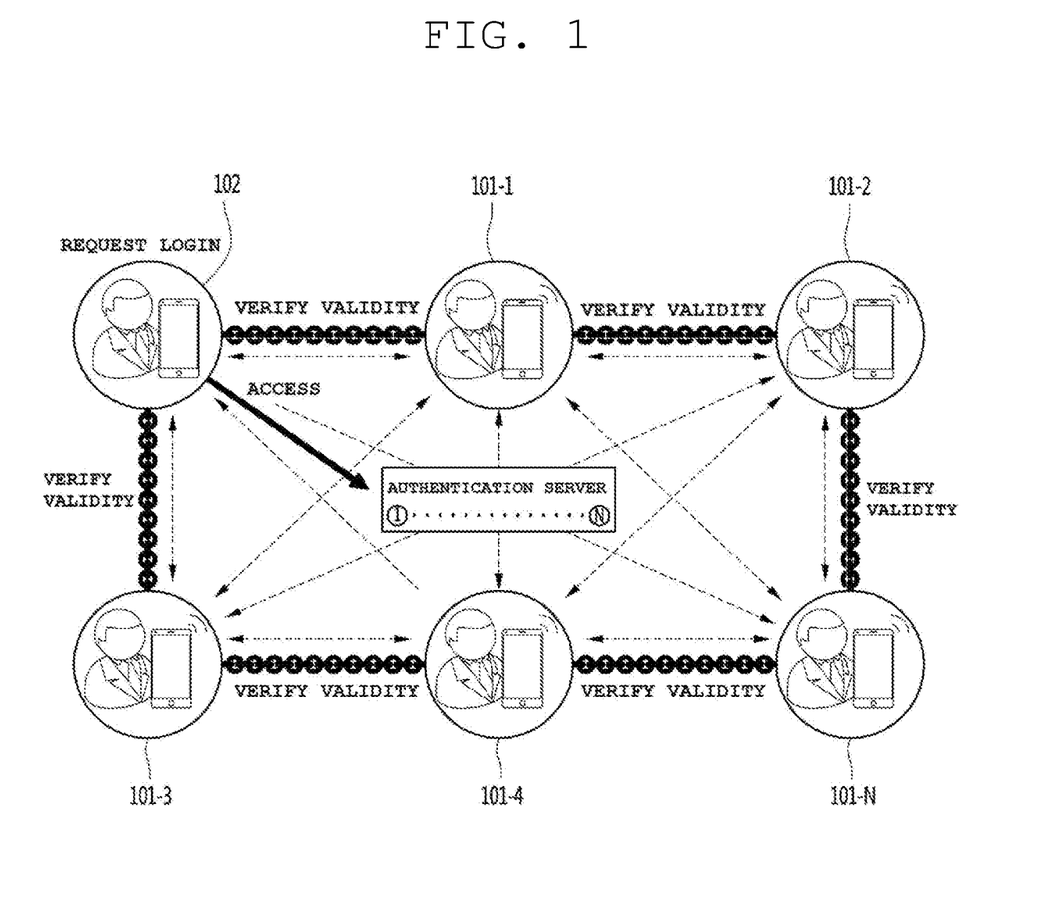
FIG. 1 is a conceptual diagram schematically illustrating an authentication method according to an exemplary embodiment of the present disclosure.

FIG. 1 is a conceptual diagram schematically illustrating an authentication method according to an exemplary embodiment of the present disclosure.

Referring to FIG. 1, an authentication method and system based on a block chain proposed in the present specification may be largely composed of (a block chain-based) authentication server/module/system/apparatus (for example, business server/module/system/apparatus, hereinafter abbreviated as 'authentication server') 103, anode (for example, a user terminal) 102 that requests authentication to a corresponding authentication server, and a plurality of nodes (for example, other user terminals that are currently accessing an authentication server) 101-1 to 101-N that directly performs authentication.

The terminal 102 may request authentication to the authentication server, and the authentication server 103 may randomly select at least some 101-1 to 101-N of a plurality of nodes currently accessed to generate a temporary block chain channel for authentication of the corresponding terminal 102. The nodes 101-1 to 101-N of the temporary block chain channel thus generated may receive data for terminal authentication from the authentication server 103 and data requested for authentication from the terminal 102, respectively. Furthermore, the nodes 101-1 to 101-N of the temporary block chain channel may perform authentication by comparing the two data with each other and transmit the comparison result to the authentication server 103.

According to the present disclosure, since the authentication is performed through multi-nodes 101-1 to 101-N, not the authentication server 103, system complexity and authentication overhead of the authentication server 103 are reduced. In addition, since the authentication is performed through multi-nodes 101-1 to 101-N, security is very high, and the risk of hacking the authentication request terminal 102 is minimized because authentication data is difficult to be forged/tampered.

Figure 2:
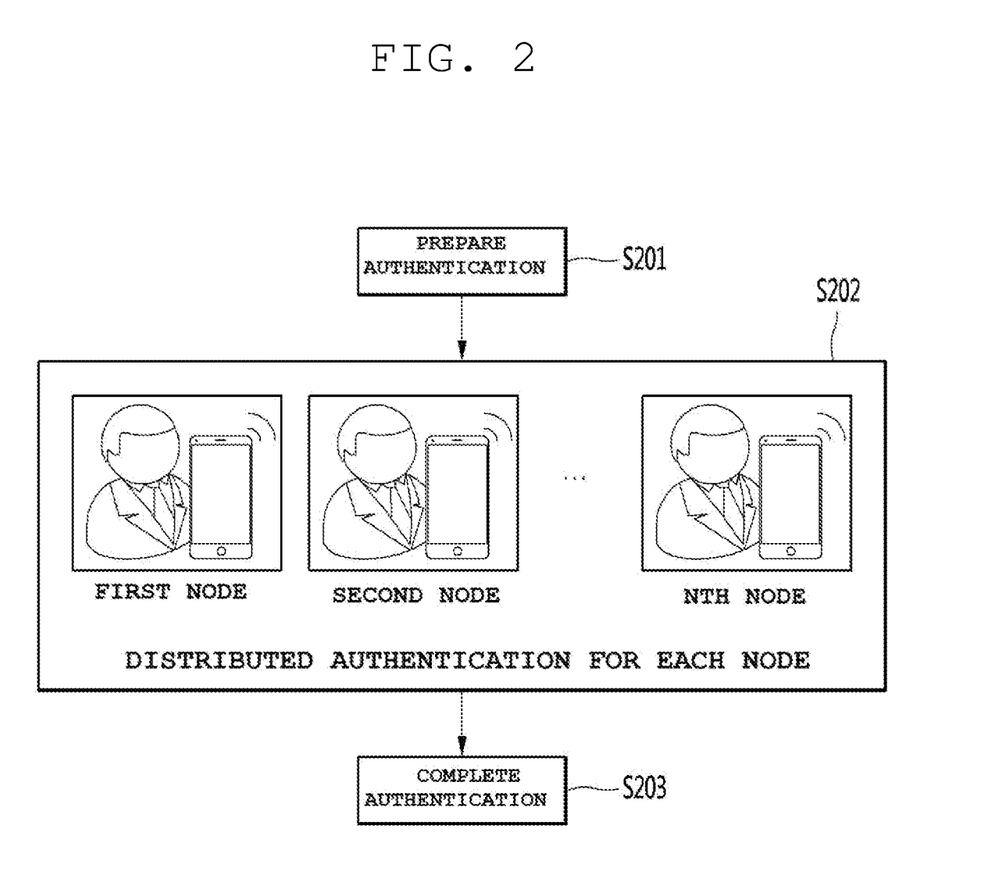
FIG. 2 is a flowchart illustrating an authentication method based on a block chain according to an exemplary embodiment of the present disclosure.

FIG. 2 is a flowchart illustrating an authentication method based on a block chain according to an exemplary embodiment of the present disclosure.

Referring to FIG. 2, the authentication method based on a block chain may be largely divided into an authentication preparation procedure (S201), an authentication procedure (S202), and an authentication completion procedure (S203).

In the authentication preparation procedure (S201), the terminal may request the authentication server to prepare for authentication, and the authentication server receiving the request performs a preparation procedure for terminal authentication. More specifically, in the authentication preparation procedure, the authentication server may randomly select a plurality of nodes authenticating the terminal to configure a temporary channel, and divide and transmit data used for authentication of the terminal (hereinafter, authentication comparison data) to the temporary channel. Here, the data used for authentication may correspond to the authentication data of the terminal registered in advance when the terminal joins the authentication server, and may correspond to, for example, a user fingerprint, an iris, a pattern, a password, an ID, an e-mail address, a unique serial number of the terminal, a media access control (MAC) address, a Bluetooth address, a WIFI service set identifier (SSID), a universally unique identifier (UUID), and/or a phone number, and the like that are registered in the terminal.

When the authentication preparation procedure is completed, the authentication server may receive data to be authenticated (hereinafter, referred to as authentication target data) from the terminal that requests authentication, and divide and transmit the received data to the nodes of the temporary channel in the same manner/category as authentication comparison data (S202). The nodes of the temporary channel may compare the authentication comparison data with the authentication target data, and transmit the comparison result to the authentication server (S202).

The authentication server may complete the authentication of the terminal based on the received comparison result (S203).

If the authentication succeeds, the authentication server may allow access to the terminal, and if the authentication fails, the authentication server may not allow access to the terminal.

The authentication preparation procedure and the authentication procedure will be described in more detail below with reference to FIG. 3.

Figure 3:
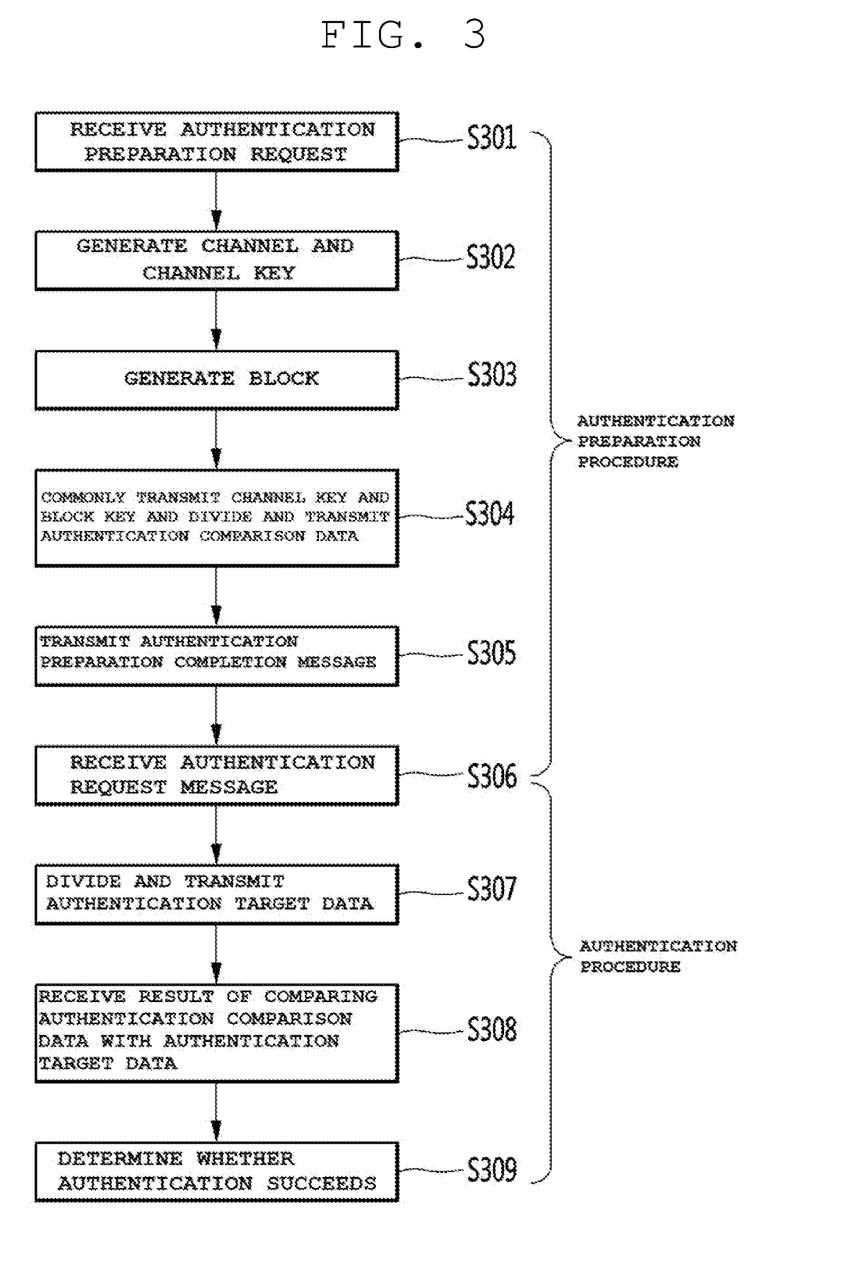
FIG. 3 is a flowchart illustrating the authentication method based on a block chain according to the exemplary embodiment of the present disclosure.

FIG. 3 is a flowchart illustrating an authentication method based on a block chain according to an exemplary embodiment of the present disclosure. It is needless to say that the execution subject of this flowchart is an 'authentication server' designed to perform the authentication of the terminal and may be implemented as an authentication module/apparatus.

Referring to FIG. 3, first, the authentication server may receive an authentication preparation request from the terminal (S301).

Next, the authentication server may randomly select a plurality of nodes that authenticates the terminal, temporarily configure a block chain channel, and generate a channel key for identifying the corresponding channel (S302).

Next, the authentication server may generate a block including the authentication comparison data used for the terminal authentication (S303). At this time, the authentication server may generate a block key for identifying the generated block and include the block key in the generated block.

Next, the authentication server may "commonly" transmit the channel key and the block key to the plurality of nodes included in the channel, and "divide" and transmit the authentication comparison data (S304). That is, the authentication server may transmit the entire channel key and block key to the nodes of the channel in the same way, while the authentication comparison data is divided by the number of nodes of the channel and the divided data may be transmitted to different nodes. As a result, the nodes of the channel receive only some of the authentication comparison data, and the data received by the nodes may be different from each other.

The authentication comparison data may be divided according to various exemplary embodiments. In the present specification, an exemplary embodiment in which authentication comparison data is divided based on "authentication category (or attribute)" is proposed. Here, the authentication category may correspond to a user fingerprint, an iris, a pattern, a password, an ID, an e-mail address, a unique serial number of the terminal, a MAC address, a Bluetooth address, a WIFI SSID, a UUID, and/or a phone number, and the like that are registered in the terminal. That is, each node may receive/store authentication comparison data of different authentication categories and be used to compare the received/stored authentication comparison data with the authentication target data. At this time, the nodes may store the channel key and/or block key together with the authentication target data. This is to make it possible to distinguish which authentication comparison data should be compared with the received authentication target data later.

Next, the authentication server may complete the authentication preparation procedure by transmitting an authentication preparation completion message including a channel key and a block key to the terminal (S305).

Next, the authentication server may receive, from the terminal, an authentication request message including a channel key, a block key, and authentication target data that the terminal requests authentication (S306).

Next, the authentication server may recognize which channel is a channel authenticating the terminal through the received channel key and may divide and transmit the received authentication target data to the corresponding channel (S307). Also, in this case, the authentication server may divide and transmit the authentication target data for each category, similar to the method of transmitting the authentication comparison data in step S304. In particular, the authentication server may divide and transmit authentication target data into the same category as the category transmitted to each node in step S304. The authentication server may transmit the channel key and/or block key together with the authentication target data, and nodes may identify/recognize what authentication comparison data to compare using the channel key and/or block key.

Next, the authentication server may receive, from the nodes of the channel, a result of comparing the divided and transmitted authentication comparison data with the divided and transmitted authentication target data (S308), and may determine based on the received comparison result whether the authentication of the terminal succeeds (S309). For example, when the authentication server receives, from nodes exceeding a preset ratio among all nodes included in the channel, the result that the divided and transmitted authentication comparison data matches the divided and transmitted authentication target data, it may be determined that the authentication of the terminal succeeds. The preset ratio may be set to be, for example, 50%, but it is needless to say to be set to a higher ratio in order to enhance the authentication security level.

Although not illustrated in this flowchart, when the authentication is completed, the authentication server may delete all the channels, channel keys, and blocks. According to the present disclosure, every time the authentication of the terminal is completed, all information/data used for the authentication is discarded, and a new channel is generated for each authentication, so the security level may be very high.

Hereinafter, an exemplary embodiment of an authentication service based on a block chain when the authentication service is applied to an actual service will be specifically illustrated. The above-mentioned 'authentication server' may be divided into an authentication server and a block chain authentication module in the following exemplary embodiments.

Figure 4:
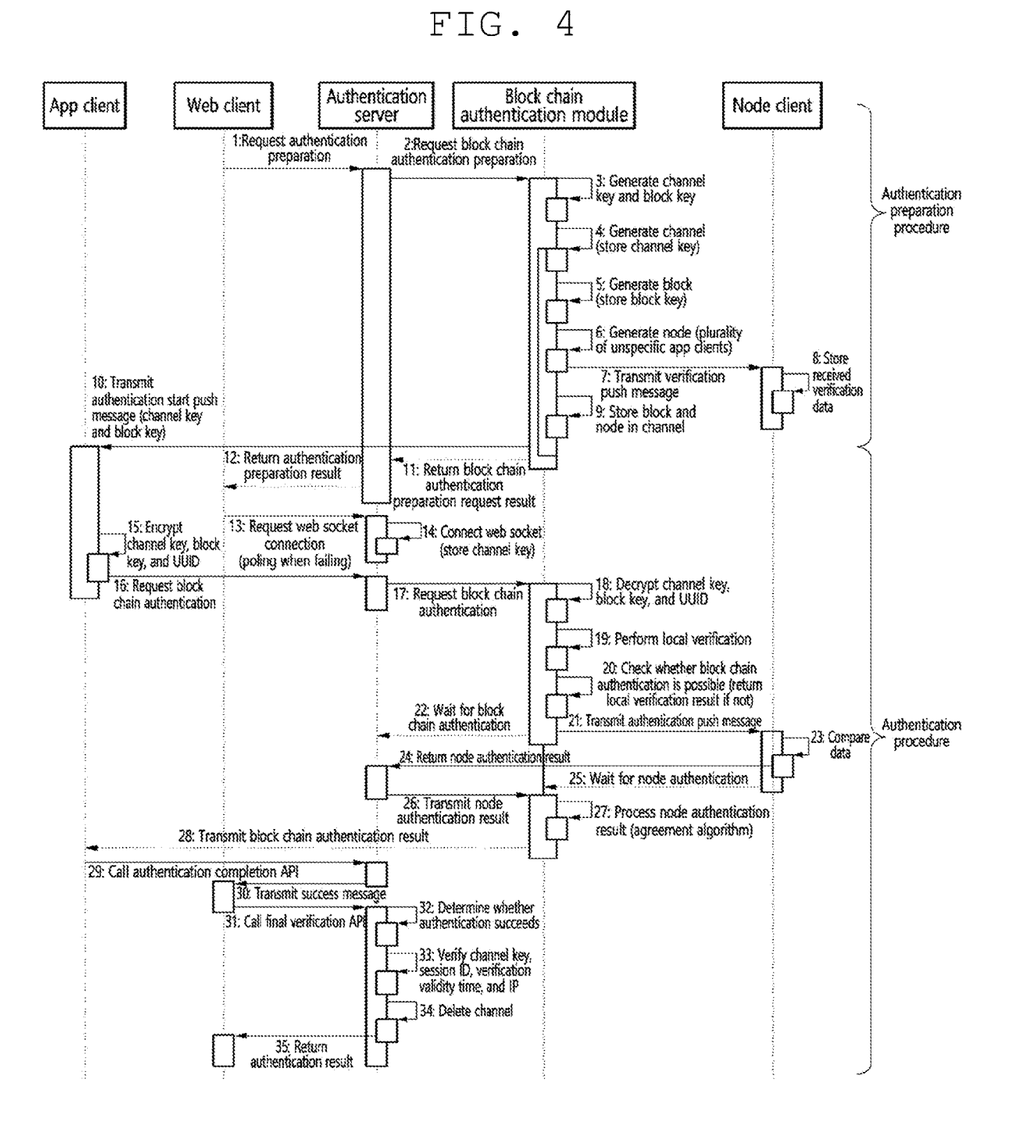
FIG. 4 is a flowchart illustrating the authentication method based on a block chain when attempting authentication through a web service/site according to the exemplary embodiment of the present disclosure.

FIG. 4 is a flowchart illustrating the authentication method based on a block chain when attempting authentication through a web service/site according to the exemplary embodiment of the present disclosure.

In this flowchart, the 'block chain authentication module' may correspond to the 'authentication server' described above with reference to FIGS. 1 to 3, and the authentication server in this flowchart may correspond to a server that finally determines whether the authentication succeeds. Therefore, the authentication server and the block chain authentication module in this flowchart may be collectively referred to as the "authentication server" in FIGS. 1 to 3. In addition, steps indicated by a dotted line in the flowchart may be deleted according to an exemplary embodiment as steps that are selectively applied. In addition, it is assumed in this flowchart that the user has requested his/her terminal authentication through the website/service.

1. First, a web client may request the authentication server to prepare for authentication for a specific user/terminal.

2. The authentication server may request an authentication preparation based on a block chain to the block chain authentication module.

3-9. The block chain authentication module may generate and store channels, channel keys, blocks, and block keys, and transmit the generated and stored channels, channel keys, blocks, and block keys to nodes of a channel. At this time, the block chain authentication module commonly transmits the channel key and the block key to nodes, but divides and transmits the authentication comparison data (by category) to the nodes as described above. The nodes that receive the channel key and the block key and the authentication comparison data may store the received information and use the received information to authenticate a user/terminal later. More detailed description of these steps is as described above with reference to FIGS. 1 to 3, and therefore duplicate description thereof will be omitted.

10-12. The block chain authentication module, which is ready for authentication, may transmit an authentication start push message including a channel key and a block key to an app client of a user terminal requesting authentication. In addition, the block chain authentication module may return the block chain authentication preparation request result to the authentication server, and the authentication server may transmit the block chain authentication preparation request result to a web client.

13-14. The web client may request a web socket connection to the authentication server, and the authentication server may connect the web socket and store the channel key according to the corresponding request.

15-17. The app client (that is, the user terminal) may encrypt the channel key, the block key, and the UUID, and transmit a block chain authentication request message including encrypted information and authentication target data to the block chain authentication module through the authentication server.

18-22. The block chain authentication module may decrypt the received channel key, block key and UUID and verify the decrypted channel key, block key and UUID locally. That is, by determining whether the channel, block, and/or authentication comparison data corresponding to the decrypted information is stored/prepared, it is determined locally whether the authentication based on the current block chain is possible, and if not, the verification result may return back to the app client to reject the authentication request. When it is determined that the authentication is possible, the block chain authentication module may transmit a verification push message including the channel key, the block key, and/or the authentication target data to nodes of a channel corresponding to the corresponding channel key. At this time, the block chain authentication module divides and transmits the authentication target data to nodes, but divides and transmits the data into the same category as the category of the authentication comparison data as described above.

23. Nodes may compare the divided and received authentication comparison data with the authentication target data to perform the authentication operation. For example, the node may determine whether the first fingerprint data received as the authentication comparison data and the second fingerprint data received as the authentication target data match each other to perform the authentication operation.

24-27. Channel nodes may transmit the authentication result to the block chain authentication module through the authentication server. When the block chain authentication module receives, from nodes exceeding the preset ratio, the result that the authentication comparison data matches the authentication target data (that is, success result), the authentication may be considered to succeed. Here, the preset ratio may be set to be 50% of the total number of channel nodes.

28. The block chain authentication module may transmit the authentication result to the app client.

29-31. The app client may call an authentication completion application programming interface (API) to the authentication server, and the authentication message may transmit a message regarding whether the authentication succeeds to the web client.

31-35. If the web client receives the message that the authentication succeeds, the verification API for finally verifying this may be called to the authentication server. To this end, the API call message transmitted to the authentication server may include attribute information regarding the authentication success or failure. Thereafter, the authentication server may finally determine whether the authentication succeeds based on the received API call message, verify a channel key, a session ID, a verification validity time, and an IP, and delete the channel used for the authentication. Furthermore, the authentication server may return the authentication result to the web client.

Figure 5:
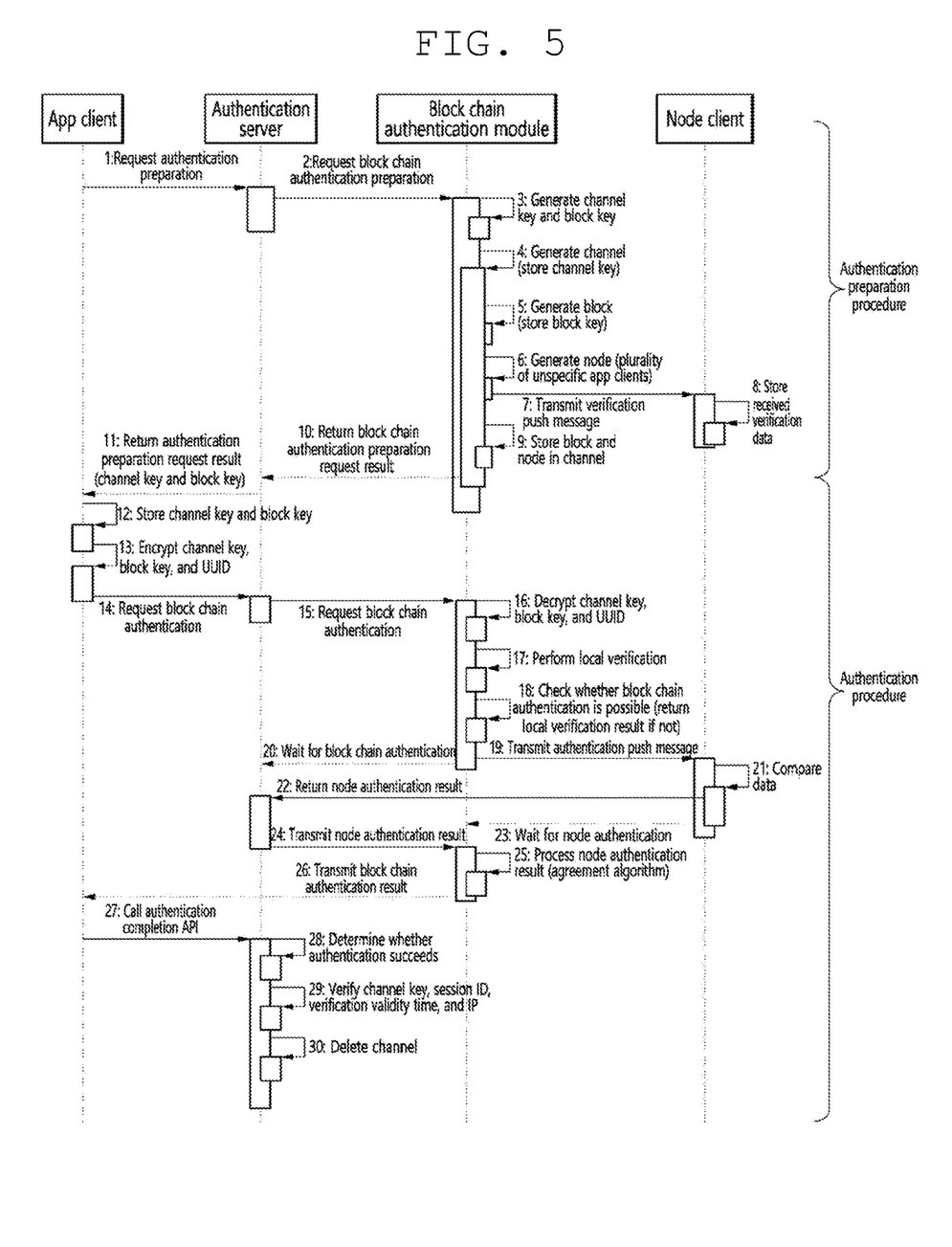
FIG. 5 is a flowchart illustrating the authentication method based on a block chain when attempting authentication through the authentication server according to the exemplary embodiment of the present disclosure.

FIG. 5 is a flowchart illustrating the authentication method based on a block chain when attempting authentication through the authentication server according to the exemplary embodiment of the present disclosure.

In this flowchart, the 'block chain authentication module' may correspond to the 'authentication server' described above with reference to FIGS. 1 to 3, and the authentication server in this flowchart may correspond to a server that finally determines whether the authentication succeeds. Therefore, the authentication server and the block chain authentication module in this flowchart may be collectively referred to as the "authentication server" in FIGS. 1 to 3. In addition, steps indicated by a dotted line in the flowchart may be deleted according to an exemplary embodiment as steps that are selectively applied. In addition, it is assumed in this flowchart that the user has requested his/her terminal authentication directly to the authentication server.

It can be seen that the present exemplary embodiment is an exemplary embodiment in which only the web client is excluded from the exemplary embodiment of FIG. 4, and only the interaction step for the web client is excluded. Therefore, since the description of each step in FIG. 4 may be applied to the present flowchart, the description of each step is replaced with the description of FIG. 4, and therefore duplicate description thereof is omitted.

Figure 6:
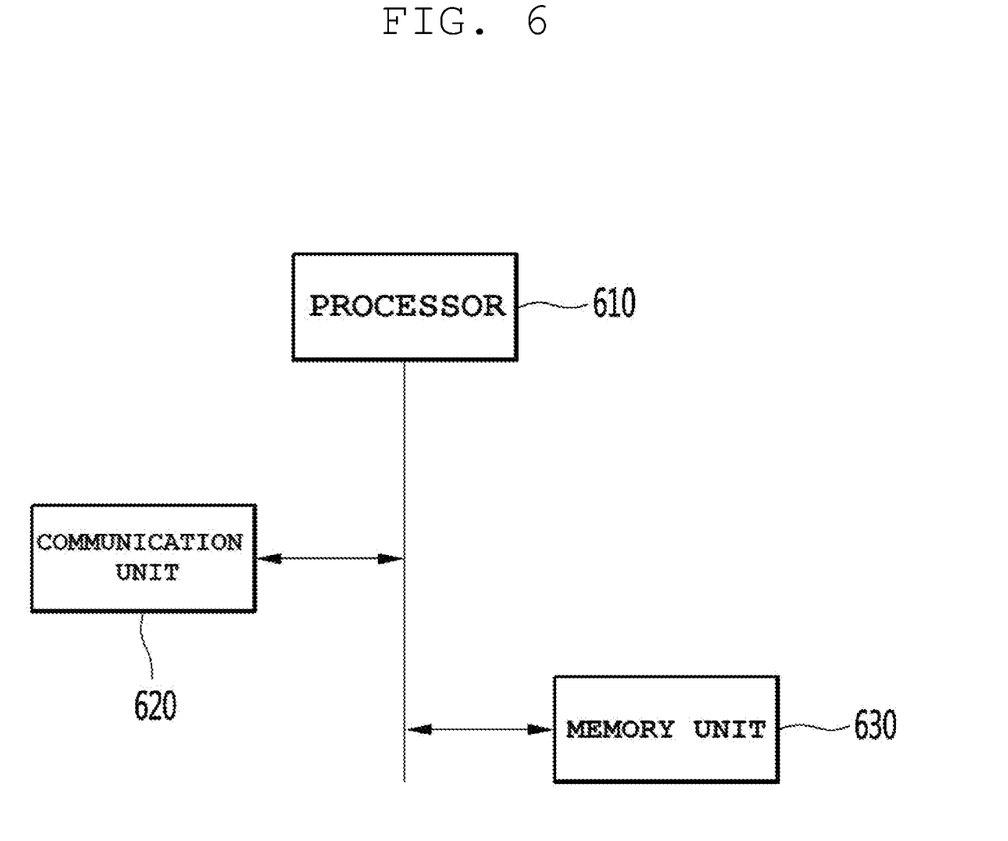
FIG. 6 is a block diagram illustrating a configuration of the authentication server (or block chain authentication module) according to the exemplary embodiment of the present disclosure.

FIG. 6 is a block diagram illustrating a configuration of the authentication server (or block chain authentication module) according to the exemplary embodiment of the present disclosure.

Referring to FIG. 6, the authentication server (or block chain authentication module) may include a processor 610, a communication unit 620, and a memory unit 630.

The communication unit 620 may perform communication using at least one wired/wireless communication protocol. The memory unit 630 may store data/information.

The processor 610 may control the communication unit 620 and the memory unit 630, and use the communication unit 620 and the memory unit 630 to perform the above-described operations/steps in FIGS. 1 to 5. Therefore, the above-described authentication server (or block chain authentication module) may be described as being replaced by a processor.

The processor 610, the communication unit 620 and the memory unit 630 may be implemented with hardware chip, component and/or circuit.

According to an exemplary embodiment of the present disclosure, since the authentication is performed through multi-nodes other than the authentication module/server, the system complexity and authentication overhead of the authentication module/server is reduced.

In addition, according to the exemplary embodiment of the present disclosure, the authentication is performed through the multi-nodes, so security is very high and the risk of hacking may be minimized due to the difficulty in forgery/tampering of authentication data.

In addition, according to the exemplary embodiment of the present disclosure, the introduction of the new authentication method has the effect that the flexibility of the authentication method is further upgraded.

The effects of the present disclosure are not limited to the aforementioned effects, and various other effects are included in the present specification.

For convenience of description, each drawing is divided and described, but it is also possible to design to implement a new exemplary embodiment by combining the exemplary embodiments described in each drawing. In the integration battery for a vehicle according to an exemplary embodiment of the present disclosure, the configurations and the methods of the exemplary embodiments as described above are not restrictively applied. Rather, all or some of the exemplary embodiments may be selectively combined with each other so that the exemplary embodiments may be variously modified.

In addition, although the preferred embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

What is claimed is:

1. An authentication method of a block chain authentication module, the authentication method comprising:
   receiving an authentication preparation request for a terminal;
   configuring a temporary channel by randomly selecting a plurality of nodes that authenticates the terminal and generating a channel key allocated to the temporary channel, wherein the temporary channel is configured according to an authentication category;
   generating a block including an authentication comparison data used for the terminal authentication, the block further including a block key allocated to the block;
   commonly transmitting the channel key and the block key to the plurality of nodes, and dividing and transmitting the authentication comparison data to the plurality of nodes according to the authentication category;
   transmitting an authentication preparation completion message including the channel key and the block key to the terminal;
   receiving, from the terminal, an authentication request message including the channel key, the block key, and authentication target data that the terminal requests authentication;
   dividing and transmitting the authentication target data to the plurality of nodes in the authentication category as the authentication category of the authentication comparison data transmitted to each node;
   receiving a result of comparing the divided and transmitted authentication comparison data with the divided and transmitted authentication target data from the plurality of nodes;
   and determining based on the received comparison result whether the authentication of the terminal succeeds.

2. The authentication method of claim 1, wherein each of the authentication comparison data and the authentication target data is divided into a plurality of authentication categories.

3. The authentication method of claim 2, wherein the dividing and transmitting of the authentication comparison data includes dividing the authentication comparison data for each authentication category and transmitting the divided authentication comparison data to different nodes.

4. The authentication method of claim 3, wherein the dividing and transmitting of the authentication target data includes dividing the authentication target data for each authentication category and transmitting the divided authentication target data to different nodes, but transmitting the divided authentication target data in the same authentication category as the authentication category of the authentication comparison data transmitted to each node.

5. The authentication method of claim 4, wherein the plurality of categories includes a user fingerprint, an iris, a pattern, a password, an ID, an e-mail address, a unique serial number of the terminal, a media access control (MAC) address, a Bluetooth address, a WIFI service set identifier (SSID), a universally unique identifier (UUID), and/or a phone number that are registered in the terminal.

6. The authentication method of claim 4, wherein the determining whether the authentication of the terminal succeeds includes determining that the authentication of the terminal succeeds when receiving, from nodes exceeding a preset ratio, a result that the divided and transmitted authentication comparison data matches the divided and transmitted authentication target data.

7. The authentication method of claim 6, wherein the preset ratio is set to be 50% of the total number of the plurality of nodes.

8. The authentication method of claim 7, further comprising: deleting the temporary channel, the channel key, and the block when the determination on whether the authentication of the terminal succeeds is completed.

9. A block chain authentication module, comprising:
   a hardware communication device configured to perform communication;
   a memory configured to store data; and a processor configured to control the communication unit and the memory unit, wherein the processor is further configured to:
   receive an authentication preparation request for a terminal;
   configure a temporary channel by randomly selecting a plurality of nodes that authenticates the terminal; and generate a channel key allocated to the temporary channel, wherein the temporary channel is configured according to an authentication category;
   generate a block including an authentication comparison data used for the terminal authentication, the block further including a block key allocated to the block, commonly transmit the channel key and the block key to the plurality of nodes;
   and divide and transmit the authentication comparison data to the plurality of nodes according to the authentication category;
   transmit an authentication preparation completion message including the channel key and the block key to the terminal;
   receive, from the terminal, an authentication request message including the channel key, the block key, and authentication target data that the terminal requests authentication;
   divide and transmit the authentication target data to the plurality of nodes in the authentication category as the authentication category of the authentication comparison data transmitted to each node;
   receive a result of comparing the divided and transmitted authentication comparison data with the divided and transmitted authentication target data from the plurality of nodes; and
   determine based on the received comparison result whether the authentication of the terminal succeeds.

10. The block chain authentication module of claim 9, wherein each of the authentication comparison data and the authentication target data is divided into a plurality of authentication categories.

11. The block chain authentication module of claim 10, wherein the processor is further configured to divide the authentication comparison data for each authentication category and transmit the divided authentication comparison data to different nodes when the authentication comparison data is divided and transmitted.

12. The block chain authentication module of claim 11, wherein the processor is further configured to divide the authentication target data for each authentication category and transmit the divided authentication target data to different nodes, but transmit the divided authentication target data in the same authentication category as the authentication category of the authentication comparison data transmitted to each node.

13. The block chain authentication module of claim 12, wherein the plurality of categories includes a user fingerprint, an iris, a pattern, a password, an ID, an e-mail address, a unique serial number of the terminal, a media access control (MAC) address, a Bluetooth address, a WIFI service set identifier (SSID), a universally unique identifier (UUID), and/or a phone number that are registered in the terminal.

14. The block chain authentication module of claim 12, wherein the processor is further configured to determine that the authentication of the terminal succeeds when receiving, from nodes exceeding a preset ratio, a result that the divided and transmitted authentication comparison data matches the divided and transmitted authentication target data.

15. The block chain authentication module of claim 14, wherein the preset ratio is set to be 50% of the total number of the plurality of nodes.

16. The block chain authentication module of claim 15, wherein the processor is further configured to delete the temporary channel, the channel key, and the block when the determination on whether the authentication of the terminal succeeds is completed.

\* \* \* \* \*